United States Patent [19]

Freeze et al.

[11] 3,775,675

[45] Nov. 27, 1973

[54] APPARATUS FOR INDICATING WHEN CURRENT EXCEEDS A PREDETERMINED LEVEL AND WHEN SAID LEVEL IS EXCEEDED FOR A PREDETERMINED PERIOD OF TIME

[75] Inventors: John A. Freeze, South Boston; Elmo D. Price, Jr., Halifax; Garlington C. Wilburn, South Boston, all of Va.

[73] Assignee: Westinghouse Electric Corporation, Pittsburgh, Pa.

[22] Filed: June 15, 1972

[21] Appl. No.: 263,055

[52] U.S. Cl. ............... 324/51, 324/55, 324/102, 324/103 P, 340/253 A
[51] Int. Cl. ............... G01r 19/16, G01r 31/00
[58] Field of Search ............... 324/34 TA, 103, 51, 324/55, 127, 133, 54, 103 P; 317/27, 38; 340/253, 253 P, 253 A, 255

[56] References Cited
UNITED STATES PATENTS
2,114,865  4/1938  Traver ........................... 324/103 P
3,029,423  4/1962  Koranye ......................... 340/253 P
3,573,614  4/1971  Wittbrodt ....................... 324/133 X
3,217,246  11/1965  Kallet et al. ..................... 324/54
3,536,994  10/1970  Johnson ......................... 324/34 TA FOREIGN PATENTS OR APPLICATIONS
1,066,472  4/1967  Great Britain ................... 324/34 TA Primary Examiner—Gerard R. Strecker
Attorney—A. T. Stratton et al.

[57] ABSTRACT

Transformer fault current monitor which provides recorded indications of the number of times any fault currents have occurred and also of the number of times fault currents which have a duration of more than a predetermined length of time have occurred. Current transformers coupled to the monitored current provide output voltages which are rectified and peak detected. The peak detected voltages are applied to first and second counting means. The first counting means is activated when the monitored current exceeds a predetermined level. The second counting means is activated when the monitored current exceeds a predetermined level for a predetermined length of time.

8 Claims, 5 Drawing Figures

APPARATUS FOR INDICATING WHEN CURRENT EXCEEDS A PREDETERMINED LEVEL AND WHEN SAID LEVEL IS EXCEEDED FOR A PREDETERMINED PERIOD OF TIME

BACKGROUND OF THE INVENTION

1. Field of the Invention

This invention relates, in general, to electrical measuring apparatus and, more specifically, to electrical current monitors.

2. Description of the Prior Art

With the increasing use of electrical power, near capacity loads are being applied to electrical power transmission and distribution systems. In heavily loaded power systems, the system components are highly susceptible to carrying electrical currents having amplitudes which exceed normal or rated currents during a fault condition. That is, the fault currents greatly exceed the rated currents of the system components.

Many types of electrical system components, such as power and distribution transformers, are constructed to withstand a certain amount of excessive fault or short circuit current. When the amount of the fault current is exceeded, or when the number of such faults is abnormally large, such transformers may be permanently damaged and must be repaired or replaced.

The amount of excessive fault current a transformer is subjected to and the frequency of occurrence of the fault is dependent on the class, type, rating, service, etc. of the transformer. In order to determine the fault current capability a transformer must withstand, it is necessary to determine the amplitude and frequency of fault currents the transformer will be subjected to.

Unfortunately, data concerning the amplitude and frequency of transformer fault currents is not plentiful. Due to the large currents involved, the usually long length of time between fault currents, the remoteness of the transformer, and other factors, normal data collecting apparatus cannot be used. It is desirable, and it is an object of this invention, to provide an electrical current monitor which will accurately and economically indicate the number of times the monitored current reaches the level of a fault or short circuit current.

Excessive currents due to faults are more damaging when sustained for a relatively long period of time. For example, a fault current occurring for only one cycle is not as destructive as a fault current occurring for ten cycles. Thus, a fault monitor which only indicates the number of times the monitored current reaches or exceeds the level of a fault current does not entirely represent the destructive conditions to which the apparatus has been subjected. Therefore, it is also desirable, and it is another object of this invention, to provide an electrical current monitor which indicates the number of times the monitored current reaches the level of a fault current for a sustained period of time.

By using the monitor disclosed herein, data can be obtained which will be useful in designing electrical apparatus to withstand short circuit currents. The monitor is also useful for providing information about excessive loads a transformer has been subjected to. This information is valuable when determining the remaining useful life of the apparatus and when making settlements on damaged transformers.

SUMMARY OF THE INVENTION

There is disclosed herein new and useful current monitoring apparatus suitable for use in detecting and recording transformer fault currents. A sensing means is coupled to the monitored current and provides an output voltage which is proportional to the monitored current. The output voltage is rectified and applied to a capacitor, thus effectively forming a peak detector. The output of the peak detector is applied to first and second counting means. The first counting means provides a recorded indication of the number of times the monitored current exceeds a predetermined level. The second counting means provides a recorded indication of the number of times the monitored current exceeds a predetermined level for a predetermined length of time. The length of time required by the second counting means to record a fault is controlled by an RC time constant.

BRIEF DESCRIPTION OF THE DRAWINGS

Further advantages and uses of this invention will become more apparent when considered in view of the following detailed description and drawings, in which:

FIG. 5 is a schematic diagram showing a modification of the circuit shown in FIG. 1 according to an embodiment of this invention.

DESCRIPTION OF THE PREFERRED EMBODIMENTS

Figure 1:
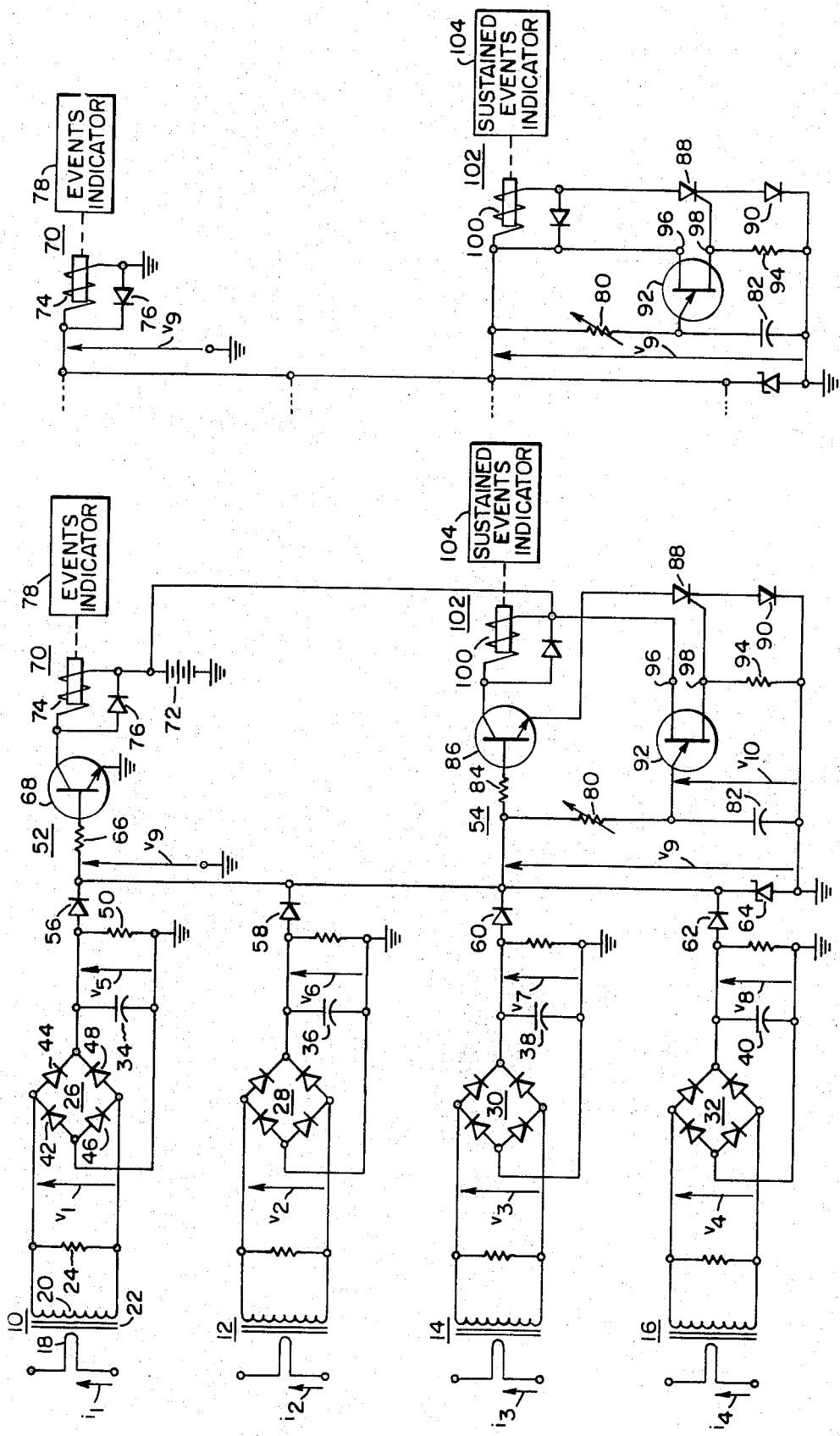
FIG. 1 is a schematic diagram of a current monitor constructed according to one embodiment of this invention.

Throughout the following description, similar reference characters refer to similar elements in all figures of the drawings.

Referring now to the drawings, and FIG. 1 in particular, there is shown a schematic diagram of a current monitor constructed according to this invention. The current monitor includes sensing means, such as the current transformers 10, 12, 14 and 16, which sense the monitored currents $i_1$, $i_2$, $i_3$ and $i_4$, and provide voltages $v_1$, $v_2$, $v_3$ and $v_4$, respectively, which are proportional to the monitored currents.

Each of the current transformers 10, 12, 14 and 16 includes an input winding, an output winding, and a magnetic core, such as the input winding 18, the output winding 20, and the magnetic core 22 of the transformer 10. The input winding 18 may be an integral part of the transformer 10 or it may be effectively formed by placing the magnetic core 22 and the output winding 20 around a conductor or bushing which is carrying the current $i_1$. Four current transformers are shown since the embodiment illustrated is suitable for use with three-phase current systems. Three of the current transformers are positioned to monitor the current at individual phase terminals or conductors and the fourth current transformer is positioned to monitor the neutral phase current. It is within the contemplation of this invention that more or less than four current transformers may be used simultaneously.

Figure 2:
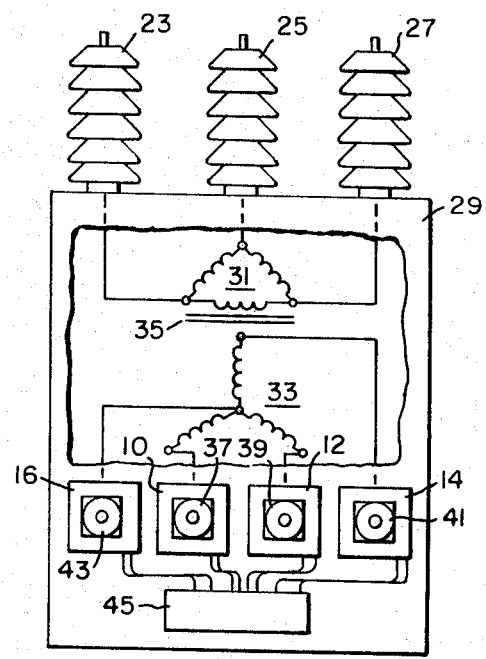
FIG. 2 is a view illustrating the arrangement of the current monitor apparatus with a power transformer.

The general arrangement of the current monitor in relationship to a power transformer is shown in FIG. 2. The primary bushings 23, 25 and 27 are mounted on the transformer casing 29 and are electrically connected to the delta-connected primary winding 31. The primary winding 31 is coupled to the wye-connected secondary winding 33 by the laminated magnetic core 35. The secondary winding 33 is connected to the phase bushings 37, 39 and 41 and to the neutral bushing 43. This invention is also applicable to delta-connected secondary windings wherein only three secondary bushings are required. Current transformers 10, 12, 14 and 16 are positioned around the bushings 37, 39, 41 and 43, respectively, and are electrically connected to the monitor housing 45 which contains the monitor circuitry and indicators.

In FIG. 1, the resistance 24 is connected across the output winding 20 of the current transformer 10 to provide a substantially constant load thereon and to maintain a satisfactory impedance as seen by the input winding 18. The voltage $v_1$ is proportional to the monitored current $i_1$. That is, the waveform of $v_1$ is similar to the waveform of the monitored current $i_1$. A similar relation exists between the voltages and currents $v_2$ and $i_2$, $v_3$ and $i_3$, and $v_4$ and $i_4$. To provide the proper voltage waveforms, the current transformers 10, 12, 14 and 16 must have magnetic cores which exhibit satisfactory magnetic characteristics. Generally, the knee of the saturation curve should be above the induction produced by the monitored current when it reaches a magnitude equal to the current magnitude which activates the monitor. For example, if the current monitor is constructed and adjusted to indicate a current which is equal to 10 times $i_1$, the induction provided by 10 $i_1$ should be below the knee of the saturation curve of the current transformer 10.

For descriptive purposes, the current $i_1$ will be referred to as the rated current and the current 10 $i_1$ will be referred to as the fault current. In accordance with this nomenclature, the current monitor indicates a current which is 10 times the rated current. Other values may be used without departing from the spirit of the invention.

Peak detecting means, such as the full-wave rectifiers 26, 28, 30 and 32 and the capacitors 34, 36, 38 and 40, provide output voltages $v_5$, $v_6$, $v_7$ and $v_8$ which initially have a magnitude that is equal to the peak of the voltage produced by the current transformers 10, 12, 14 and 16. The full-wave rectifier 26 includes the diode elements 42, 44, 46 and 48. The resistance 50 discharges the capacitor 34 in sufficient time to prevent false indications of the monitor. A sufficient time is equal to approximately two cycles of the monitored current. Generally, this time must be long enough for the monitor to respond to instantaneous events but short enough to prevent the monitor to inaccurately respond to an instantaneous event as a sustained event. For example, if a sustained event is to be indicated for each fault current having a duration which is greater than 10 cycles, the voltage $v_5$ produced by an instantaneous event must be reduced within 10 cycles to prevent an inaccurate indication.

The voltages $v_5$, $v_6$, $v_7$ and $v_8$ are applied to the first counting means 52 and to the second counting means 54 by the isolation diodes 56, 58, 60 and 62, respectively. The Zener diode 64 protects the counting means 52 and 54 from excessive voltages. The duration of the voltage applied to the counting means 52 and 54 determines which counting means will be activated.

The largest of the voltages $v_5$, $v_6$, $v_7$ and $v_8$ determines the magnitude of the counting voltage $v_9$. Voltage $v_9$ is applied through the input resistor 66 to the transistor 68 which form a switching means. If voltage $v_9$ has sufficient magnitude, transistor 68 is turned on and energizes the electromechanical indicating device 70. The battery 72 provides power for operation of the coil 74 of the indicating device 70 and the diode 76 prevents current transients in the coil 75. The events indicator 78 indicates the number of times the coil 74 has been energized. The indicating device 70 may be a stepping relay, counter, or other suitable component. The indicator 78 may be located at a position which is remote from the current being monitored.

The indication provided by the indicator 78 provides information about the number of times the monitored current exceeded a predetermined value, such as 10 times the rate current. A short delay in indicating an abnormally high current results from the response time required for the indicating device 70 to function. Generally, the response time will be in the range of one or two cycles. The time constant of the resistor-capacitor combination, such as the resistor 50 and the capacitor 34, also effectively governed the overall response time. If the response time is too fast, it is possible that an inaccurate indication will be displayed. For example, a fault current occurring for four cycles could be indicated as four separate faults if the monitor responds to each cycle separately. It is desirable that such faults be indicated as one separate fault.

The second counting means 54 provides information about the number of events, such as fault currents, which have a duration of a predetermined length of time, such as 10 cycles. The voltage $v_9$ is applied across the variable resistor 80 and the capacitor 82. Voltage $v_9$ is also applied, through the input resistor 84, to a switching means which includes the transistor 86, the silicon controlled rectifier 88, and the diode 90. The voltage $v_{10}$ develops across the capacitor 82. The rate with which the voltage $v_{10}$ develops is governed by the values of the resistor 80 and the capacitor 82 and may be adjusted by changing the resistance of the resistor 80. To correspond with other parts of this description of the preferred embodiments, it will be assumed that resistor 80 is adjusted to provide a full voltage $v_{10}$ after 10 cycles of fault current.

When the voltage $v_{10}$, which is applied to the unijunction transistor 92 through the resistor 94, reaches its full value, the transistor 92 is turned on and the terminals 96 and 98 have a low voltage drop therebetween. This fires the silicon controlled rectifier 88 which completes the circuit to the transistor 86. Transistor 86 is then turned on and the coil 100 of the indicating device 102 is energized to operate the indicator 104. The indicating device 102 may be similar to the indicating device 70 described herein. Thus, indicator 104 displays the number of times the fault current exceeds 10 cycles in duration. A longer fault duration would not be displayed as an additional fault.

Figure 3:
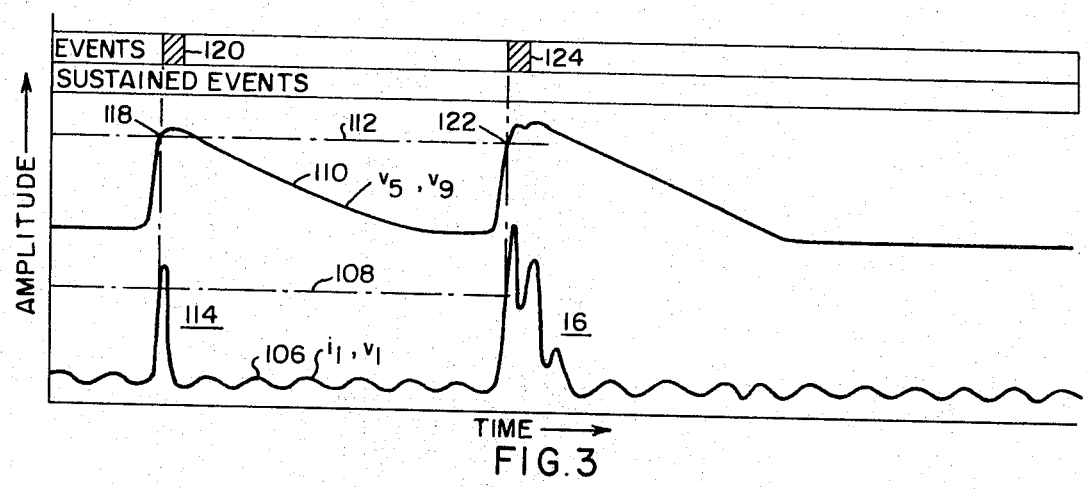
FIGS. 3 and 4 are graphs illustrating voltage and current waveforms which may exist in the current monitor shown in FIG. 1.
Figure 4:
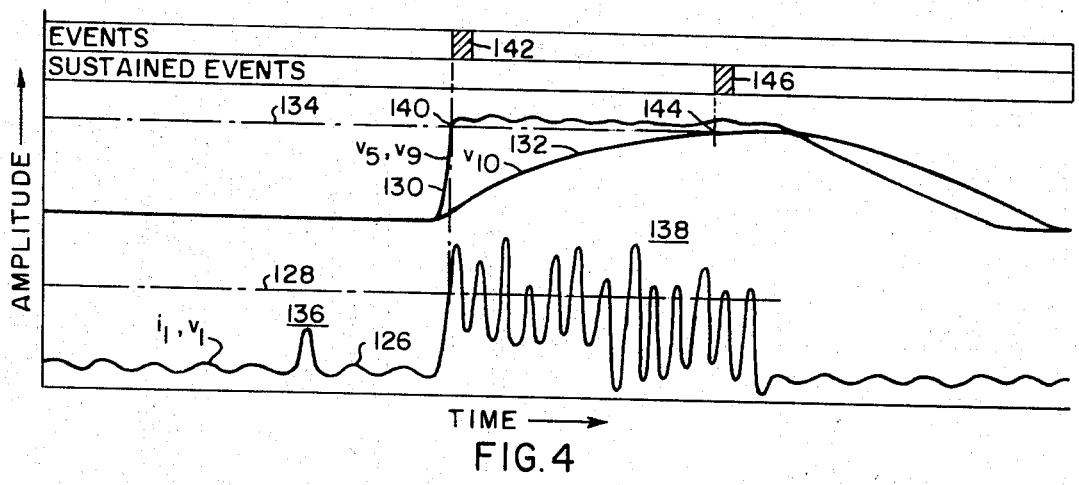

Graphical representations of various monitor voltages and their relation to time are shown in FIGS. 3 and 4. In FIG. 3, the monitored current $i_1$ is illustrated by the curve 106. During the time for which the curve 106 is plotted, the monitored current is increased abnormally by two different fault conditions 114 and 116. Curve 106 also corresponds to the voltage $v_1$. The line 108 indicates the level of current $i_1$ above which a fault event is to be recorded.

Curve 110 represents the voltages $v_5$ and $v_9$ which occur in the current monitor when the current $i_1$ has the waveform as shown by curve 106. The line 112 indicates the level above which a fault event is recorded. When the fault condition 114 causes the voltage $v_9$ to reach the point 118, a fault event is recorded as indicated by the block 120. When the fault condition 116 causes the voltage $v_9$ to reach the point 122, another event is recorded, as indicated by the block 124. Thus, for the time plotted, two faults and no sustained faults have been recorded.

In FIG. 4, the curve 126 represents the current $i_1$ and the voltage $v_1$, the line 128 represents the fault current level, the curve 130 represents the voltages $v_5$ and $v_9$, the curve 132 represents the voltage $v_{10}$, and the line 134 represents the events recording level. The fault condition 136 is below the fault current indicating level 128 and does not produce a recorded event. The fault condition 138 produces a current which goes above the indicating level 128 for over 10 cycles. The corresponding voltage $v_9$ reaches the point 140 and records an event as indicated by the block 142. Due to the duration of the fault condition, the voltage $v_{10}$ reaches the point 144 after 10 cycles and records a sustained event as indicated by the block 146. Thus, for the time plotted, one fault and one sustained fault have been recorded.

Referring again to FIG. 1, the battery 72 may be eliminated from the current monitor by substituting the battery voltage by the voltage provided by the rectifiers 26, 28, 30 and 32. The turns ratio and load impedance of the current transformers 10, 12, 14 and 16 would have to be properly selected to provide the required operating voltages.

FIG. 5 illustrates a current monitor circuit modification which permits the elimination of the battery 72 and the driving transistors 68 and 86 which are shown in the circuit of FIG. 1. In FIG. 5, the peak detector voltage $v_9$ is applied directly to the coil 74. The voltage $v_9$ is also applied to the coil 100 when the voltage across the capacitor 82 is sufficient to turn on the transistor 92 and trigger the silicon controlled rectifier 98.

Since numerous changes may be made in the above described apparatus and different embodiments of the invention may be made without departing from the spirit thereof, it is intended that all of the matter contained in the foregoing description, or shown in the accompanying drawings, shall be interpreted as illustrative rather than limiting.

We claim as our invention:

1. A current monitor comprising sensing means responsive to a monitored current, said sensing means providing a first voltage which is proportional to the monitored current, peak detecting means connected to said sensing means, said peak detecting means providing a second voltage which is proportional to the peak of the first voltage, first counting means connected to said peak detecting means, said first counting means providing an indication of the number of times the second voltage exceeds a predetermined magnitude, and second counting means connected to said peak detecting means, said second counting means providing an indication of the number of times the second voltage exceeds the predetermined magnitude for a predetermined length of time.

2. The current monitor of claim 1 wherein the sensing means comprises electrical inductive apparatus having an output winding, the first voltage being developed across said output winding.

3. The current monitor of claim 2 wherein the electrical inductive apparatus includes an input winding through which the monitored current flows.

4. The current monitor of claim 1 wherein the peak detecting means comprises rectification means and energy storing means, said rectification means providing a rectified voltage across said energy storing means, the energy storing means maintaining a voltage thereon having a magnitude which is substantially equal to the peak of the rectified voltage.

5. The current monitor of claim 1 wherein the first counting means comprises an electromechanical indicating means which provides an additional indication each time the electromechanical indicating means is energized, said electromechanical indicating means being energized by first switching means, the second voltage being applied to said first switching means, and said first switching means conducting when the second voltage exceeds the predetermined magnitude.

6. The current monitor of claim 1 wherein the second counting means comprises an electromechanical indicating means which provides an additional indication each time the electromechanical indicating means is energized, said electromechanical indicating means being energized by second switching means, the second voltage being applied to said second switching means, and said second switching means conducting when the second voltage exceeds the predetermined magnitude for the predetermined length of time.

7. The current monitor of claim 6 wherein the second switching means comprises energy storing means which is electrically connected to the second voltage through an impedance means, said energy storing means developing a third voltage thereon when the second voltage exceeds the predetermined magnitude for the predetermined length of time, said third voltage being applied to a solid state circuit element, said circuit element conducting when the third voltage is applied thereto.

8. A current monitor comprising a current transformer, said current transformer providing a first voltage which is proportional to the current being monitored, full-wave rectification means having input and output terminals, the first voltage being applied to said input terminals, a first capacitor connected across said output terminals, said capacitor having sufficient capacitance to provide a second voltage thereon which is substantially equal to the peak of the voltage developed at the output terminals of said rectification means, first and second counting means, the second voltage being applied to said first counting means which provides an indication of the number of times the second voltage exceeds a predetermined magnitude, the second voltage being applied to a serial combination of a resistor and a second capacitor, the voltage across said second capacitor being applied to said second counting means which provides an indication of the number of times the second voltage exceeds the predetermined magnitude for a predetermined length of time.

* * * * *